(12) United States Patent
Hibi (10) Patent No.: US 12,546,243 B2
(45) Date of Patent: Feb. 10, 2026

(54) HONEYCOMB STRUCTURE

(71) Applicant: NGK Insulators, Ltd., Nagoya (JP)

(72) Inventor: Noriyuki Hibi, Anjo (JP)

(73) Assignee: NGK INSULATORS, LTD., Nagoya (JP)

( * ) Notice: Subject to any disclaimer, the term of this patent is extended or adjusted under 35 U.S.C. 154(b) by 507 days.

(21) Appl. No.: 17/645,766

(22) Filed: Dec. 23, 2021

(65) Prior Publication Data

US 2022/0316373 A1 Oct. 6, 2022

(30) Foreign Application Priority Data

Mar. 31, 2021 (JP) .................................. 2021-059988

(51) Int. Cl.
*F01N 3/022* (2006.01)
*F01N 3/28* (2006.01)

(52) U.S. Cl.
CPC .......... *F01N 3/2828* (2013.01); *F01N 3/0222* (2013.01); *F01N 2330/60* (2013.01)

(58) Field of Classification Search
CPC ..................................................... F01N 3/2828
See application file for complete search history.

(56) References Cited

U.S. PATENT DOCUMENTS

2006/0210822 A1* 9/2006 Ono .......................... B01J 35/57
428/116
2007/0119133 A1* 5/2007 Beall ................ B01D 46/24495
55/523

(Continued)

FOREIGN PATENT DOCUMENTS

CN 101583407 A 11/2009
CN 111886073 A 11/2020
(Continued)

OTHER PUBLICATIONS

Precision Ceramics, "Flexural Strength", 2022, p. 1-7; Accessed at https://web.archive.org/web/20220308075353/https://precision-ceramics.com/materials/properties/flexural-strength/.*

(Continued)

*Primary Examiner* — Humera N. Sheikh
*Assistant Examiner* — Julia L Rummel
(74) *Attorney, Agent, or Firm* — BURR PATENT LAW, PLLC (57) ABSTRACT

A honeycomb structure includes a pillar-shaped honeycomb structure body having a porous partition wall and a circumferential wall, wherein the partition wall and the circumferential wall are integrally formed product made of the same material, a porosity of the partition wall is 45 to 70%, when a material strength of the material constituting the partition wall is set to F [MPa], a thermal conductivity of the material is set to k [W/mL], a bulk density of the honeycomb structure body is set to ρ [g/cc], a Young's modulus of the material is set to E [GPa], a thermal expansion coefficient of the material is set to α [$10^{-6}$/° C.], and in a section orthogonal to the extending direction of the cells of the honeycomb structure body, a difference in thickness of the circumferential wall is set to ΔT [mm], P calculated by the following equation (1) is 3.0 or more.

$$P = F \times k \times \rho / (E \times \alpha \times \Delta T) \quad \text{Equation (1)}$$

6 Claims, 5 Drawing Sheets

(56) References Cited

U.S. PATENT DOCUMENTS

| | | | |
|---|---|---|---|
| 2009/0239032 A1 | 9/2009 | Ichikawa et al. | |
| 2012/0023879 A1* | 2/2012 | Okazaki | C04B 38/0009 |
| | | | 264/631 |
| 2013/0019579 A1* | 1/2013 | Okazaki | B01D 46/2429 |
| | | | 264/177.12 |
| 2013/0270258 A1* | 10/2013 | Kondo | F01N 3/2828 |
| | | | 428/116 |
| 2014/0290195 A1* | 10/2014 | Izumi | B01J 23/002 |
| | | | 264/631 |
| 2014/0370233 A1* | 12/2014 | Izumi | C03C 10/0045 |
| | | | 428/116 |
| 2015/0225299 A1* | 8/2015 | Alary | B01D 39/2075 |
| | | | 428/116 |
| 2020/0384453 A1 | 12/2020 | Sasaki | |

FOREIGN PATENT DOCUMENTS

| | | | | |
|---|---|---|---|---|
| JP | 2019-093381 A1 | 6/2019 | | |
| WO | WO-2006103963 A1 * | 10/2006 | | B01D 46/2429 |

OTHER PUBLICATIONS

English language translation of WO 2006/103963 A1, generated on Apr. 9, 2024 with Espacenet website (https://worldwide.espacenet.com/).*

German Office Action (with English translation) dated Feb. 26, 2024 (Application No. 10 2022 200 551.1).

* cited by examiner

HONEYCOMB STRUCTURE

The present application is an application based on JP 2021-059988 filed on Mar. 31, 2021 with Japan Patent Office, the entire contents of which are incorporated herein by reference.

BACKGROUND OF THE INVENTION

Field of the Invention

The present invention relates to a honeycomb structure. More specifically, it relates to a honeycomb structure with high porosity and excellent thermal shock resistance.

Description of the Related Art

In recent years, society as a whole has become increasingly aware of environmental problems, and in the technical field of combusting fuel to generate power, various techniques have been developed to remove harmful components such as nitrous oxides from exhaust gas generated when the fuel is combusted. For example, various techniques have been developed to remove harmful components such as nitrous oxides from exhaust gas emitted from engines of automobiles. In removing harmful components in such exhaust gas, it is common to use a catalyst to cause a chemical reaction to the harmful components to be changed into another component which is relatively harmless. Then, a honeycomb structure is used as a catalyst carrier for loading a catalyst for exhaust gas purification.

Conventionally, as such a honeycomb structure, there has been proposed a honeycomb structure including a honeycomb structure body having a porous partition wall for defining and forming a plurality of cells serving as fluid through channels extending from an inflow end face to an outflow end face.
[Patent Document 1] JP-A-2019-93381

SUMMARY OF THE INVENTION

In the technique of purification of exhaust gas using honeycomb structure as a catalyst carrier, as described above, lowering of heat capacity of the honeycomb structure has been required every year for the early activation of the catalyst, and in order to realize it, increasing porosity of the honeycomb structure has been studied. For example, increasing porosity of the honeycomb structure can be realized by increasing the porosity of the porous partition wall constituting the honeycomb structure.

However, increasing the porosity of the partition wall causes a decrease in thermal shock resistance of the honeycomb structure due to a decrease in structural strength and a decrease in thermal conductivity associated with a decrease in the volume of the substantial portion of the partition wall. As described above, increasing porosity of the honeycomb structure and suppressing the decrease in thermal shock resistance of the honeycomb structure are inconsistent with each other, and it is extremely difficult to achieve both of them. In addition, although there is a conventional method to estimate thermal shock resistance from material strength, material Young's modulus, material thermal conductivity, and material thermal expansion coefficient, there are cases in which it cannot be estimated because it does not match the substance.

The present invention has been made in view of the problems with the prior arts described above. The present invention provides a honeycomb structure with high porosity and excellent thermal shock resistance.

According to the present invention, there is provided a honeycomb structure to be described below.

[1] A honeycomb structure including: a pillar-shaped honeycomb structure body having a porous partition wall disposed so as to surround a plurality of cells serving as fluid through channels extending from a first end face to a second end face, and having a circumferential wall disposed so as to encompass the partition wall, wherein
the partition wall and the circumferential wall constituting the honeycomb structure body are integrally formed product made of the same material,
a porosity of the partition wall is 45 to 70%,
when a material strength of the material constituting the partition wall is set to F [MPa],
a thermal conductivity of the material constituting the partition wall is set to k [W/mK],
a bulk density of the honeycomb structure body is set to $\rho$ [g/cc],
a Young's modulus of the material constituting the partition wall is set to E [GPa],
a thermal expansion coefficient of the material constituting the partition wall is set to $\alpha$ [$10^{-6}$/° C.], and
in a section orthogonal to the extending direction of the cells of the honeycomb structure body, a difference in thickness of the circumferential wall obtained by subtracting the minimum thickness T2 [mm] of the circumferential wall from the maximum thickness T1 [mm] of the circumferential wall is set to $\Delta T$ [mm],
P calculated by the following equation (1) is 3.0 or more.

$$P = F \times k \times \rho / (E \times \alpha \times \Delta T) \qquad \text{Equation (1)}$$

(In the equation (1), when the difference in thickness of the circumferential wall represented by $\Delta T$ is less than 0.06 mm, 0.06 shall be substituted as the value of $\Delta T$.)

[2] The honeycomb structure according to [1], wherein the material strength F is 4 to 10 [MPa].

[3] The honeycomb structure according to [1] or [2], wherein the thermal conductivity k is 0.8 to 2.5 [W/mK].

[4] The honeycomb structure according to any one of [1] to [3], wherein the bulk density $\rho$ is 0.15 to 0.50 [g/cc].

[5] The honeycomb structure according to any one of [1] to [4], wherein the Young's modulus E is 8 to 30 [GPa].

[6] The honeycomb structure according to any one of [1] to [5], wherein the thermal expansion coefficient $\alpha$ is 0.10 to 0.75 [$10^{-6}$/° C.].

[7] The honeycomb structure according to any one of [1] to [6], wherein the difference in thickness $\Delta T$ of the circumferential wall is 0.20 mm or less.

[8] The honeycomb structure according to any one of [1] to [7], wherein the P calculated by the equation (1) is 3.0 to 30.

[9] The honeycomb structure according to [8], wherein the P calculated by the equation (1) is 5.5 to 30.

The honeycomb structure of the present invention is intended to achieve the effect of excellent thermal shock resistance while realizing a high porosity of the partition wall. That is, the honeycomb structure of the present invention has a partition wall having a high porosity of 45 to 70%. Therefore, it is possible to realize a low heat capacity of the honeycomb structure and to prompt an early activation of the catalyst when utilized as a catalyst carrier for loading the catalyst for exhaust gas purification. In the honeycomb structure of the present invention, P calculated by the above equation (1) is 3.0 or more, which is excellent in thermal shock resistance. In particular, when the P calculated by the above equation (1) is 3.0 or more, the honeycomb structure can suppress the thermal stress generated when exposed to a high-temperature exhaust gas emitted from an engine of an automobile or the like within an allowable range, and can extremely effectively suppress the generation of cracks due to the thermal stress.

DESCRIPTION OF THE PREFERRED EMBODIMENTS

Hereinafter, embodiments of the present invention will be described. However, the present invention is not limited to the following embodiments. Therefore, it should be understood that changes, improvements, and the like may be appropriately added to the following embodiments based on ordinary knowledge of a skill in art without departing from the spirit of the present invention.

Figure 1:
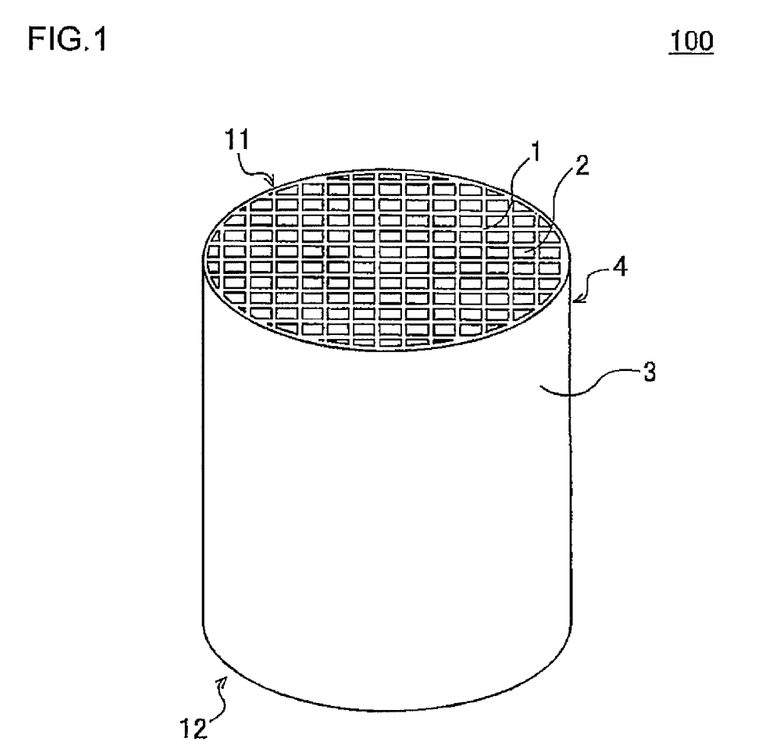
FIG. 1 is a perspective view schematically showing one embodiment of the honeycomb structure of the present invention as viewed from a first end face side.
Figure 2:
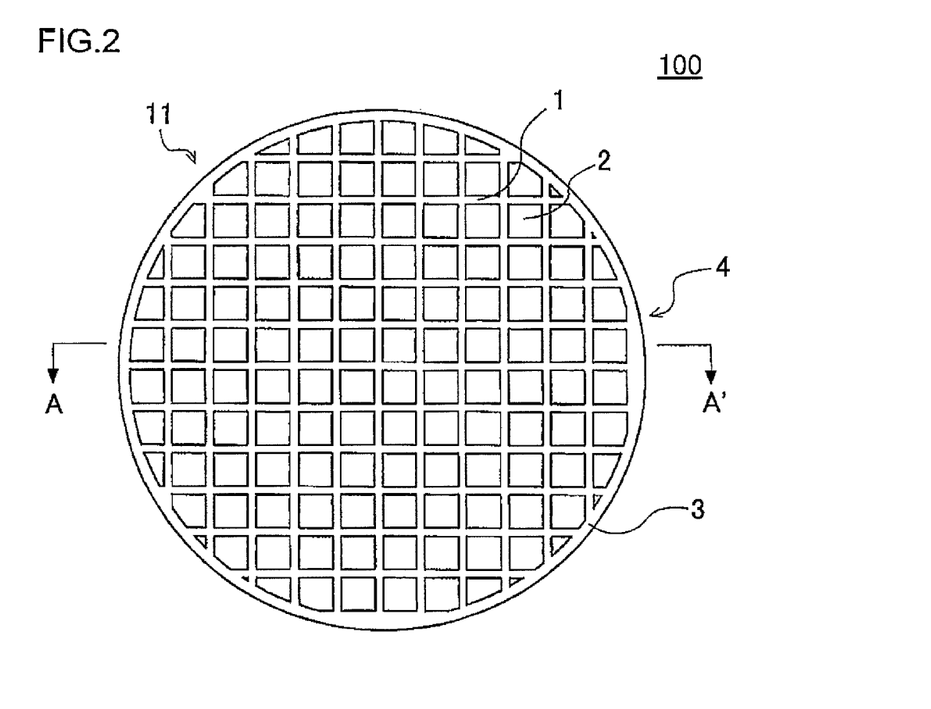
FIG. 2 is a plan view schematically showing the first end face of the honeycomb structure shown in FIG. 1.
Figure 3:
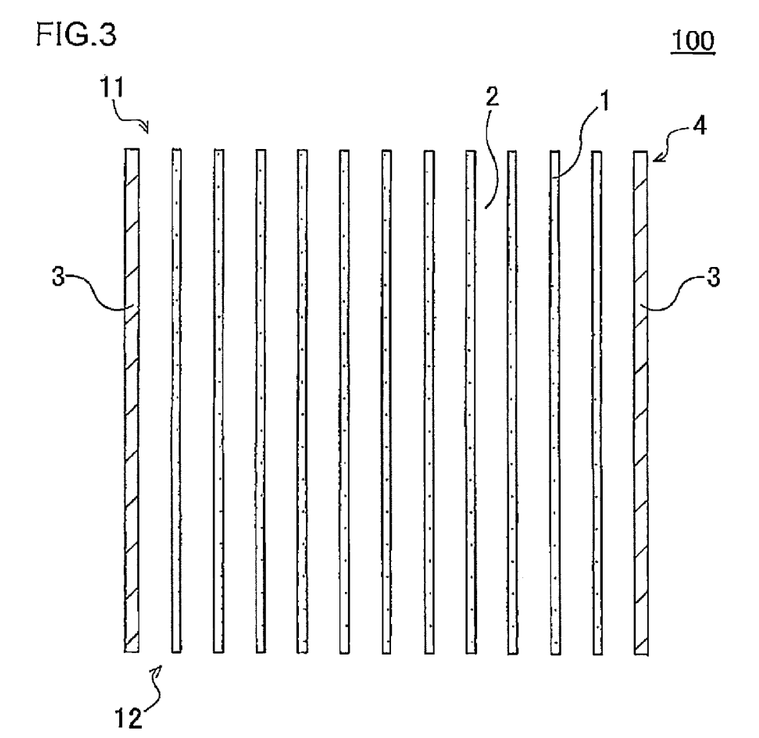
FIG. 3 is a sectional view schematically showing a section taken along the line A-A' of FIG. 2.

(1) Honeycomb Structure:

As shown in FIGS. 1 to 3, one embodiment of the honeycomb structure of the present invention is a honeycomb structure 100 including a pillar-shaped honeycomb structure body 4 having a porous partition wall 1 disposed so as to surround a plurality of cells 2 and a circumferential wall 3 disposed so as to encompass the partition wall 1. Here, FIG. 1 is a perspective view schematically showing one embodiment of the honeycomb structure of the present invention as viewed from a first end face side. FIG. 2 is a plan view schematically showing the first end face of the honeycomb structure shown in FIG. 1. FIG. 3 is a sectional view schematically showing a section taken along the line A-A' of FIG. 2.

The porous partition wall 1 constituting the honeycomb structure body 4 is disposed so as to surround a plurality of cells 2 extending from the first end face 11 to the second end face 12. In the present invention, the cell 2 means a space defined by the partition wall 1. The plurality of cells 2 serve as fluid through channels. The circumferential wall 3 is disposed so as to encompass the partition wall 1 disposed in a grid pattern so as to surround the plurality of cells 2. The circumferential wall 3 of the honeycomb structure body 4 is preferably constituted integrally with the partition wall 1. The honeycomb structure 100 can be suitably used as a catalyst carrier for loading a catalyst for exhaust gas purification. The catalyst carrier is a porous structure that supports particulates of the catalyst. The partition wall 1 and the circumferential wall 3 constituting the honeycomb structure body 4 are integrally formed products made of the same materials.

In the honeycomb structure 100, a porosity of the partition wall 1 is 45 to 70%. As described above, the honeycomb structure 100 has the partition wall 1 with high porosity, realizes a low heat capacity of the honeycomb structure 100, and can prompt an early activation of the catalyst when utilized as a catalyst carrier for loading the catalyst for exhaust gas purification.

The porosity of the partition wall 1 is measured by the mercury press-in method, and can be measured using, for example, Autopore IV (trade name) manufactured by Micromeritics. The porosity can be measured by cutting out a part of the partition wall 1 from the honeycomb structure 100 to obtain a test piece, and using the obtained test piece. The porosity of the partition wall 1 is preferably, for example, 45 to 70%, and more preferably 45 to 55%

In the honeycomb structure 100, P calculated by the following equation (1) is 3.0 or more. Here, each symbol in the following equation (1) is as follows. A material strength of the material constituting the partition wall 1 is set to F [MPa]. A thermal conductivity of the material constituting the partition wall 1 is set to k [W/mK]. A bulk density of the honeycomb structure body 4 is set to ρ [g/cc]. A Young's modulus of the materials constituting the partition wall 1 is set to E [GPa]. A thermal expansion coefficient of the materials constituting the partition wall 1 is set to $\alpha[10^{-6}/°C]$. In addition, in a section orthogonal to the extending direction of cells 2 of the honeycomb structure body 4, the maximum thickness of the circumferential wall 3 is defined as the maximum thickness T1 [mm], the minimum thickness of the circumferential wall 3 is defined as the minimum thickness T2 [mm], and the difference in thickness of the circumferential wall 3 obtained by subtracting the minimum thickness T2 [mm] of the circumferential wall 3 from the maximum thickness T1 [mm] of the circumferential wall 3 is set to ΔT [mm].

$$P = F \times k \times \rho / (E \times \alpha \times \Delta T) \qquad \text{Equation (1)}$$

(In the above equation (1), when the difference in thickness of the circumferential wall 3 expressed by ΔT is less than 0.06 mm, 0.06 shall be substituted as the value of ΔT.)

When P calculated by the above equation (1) is 3.0 or more, the honeycomb structure 100 achieve the effect of excellent thermal shock resistance while realizing a high porosity of the partition wall 1. In particular, when the P calculated by the above equation (1) is 3.0 or more, the honeycomb structure can suppress the thermal stress generated when exposed to a high-temperature exhaust gas emitted from an engine of an automobile or the like within an allowable range, and can extremely effectively suppress the generation of cracks due to the thermal stress.

Hereinafter, a measuring method of each parameter used in calculating the P represented by the equation (1) will be described.

(Material Strength F [MPa])

Figure 4:
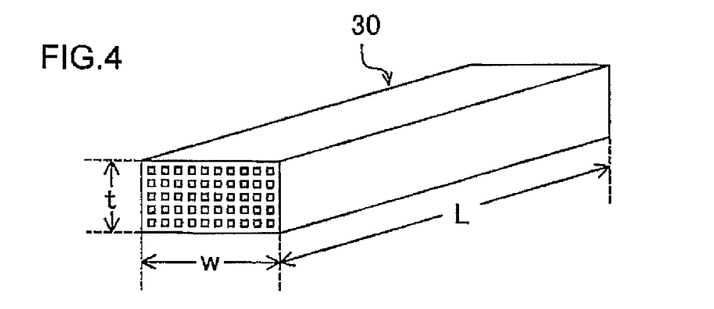
FIG. 4 is a perspective view schematically showing a test piece for measuring cut out from the honeycomb structure.

First, in the measurement of the material strength F [MPa], the test piece 30 for measurement as shown in FIG. 4 is cut out from the honeycomb structure 100 as shown in FIGS. 1 to 3. FIG. 4 is a perspective view schematically showing the test piece 30 for measurement cut out from the honeycomb structure 100 (see FIG. 1). In the measurement of the material strength F [MPa], the size of the test piece 30 is as follows. The width w of the test piece 30 is about 20 mm, the thickness t of the test piece 30 is about 10 mm, and the length L of the test piece 30 is about 70 mm. The length L of the test piece 30 is an extending direction of the cell 2, in other words, a direction from the first end face 11 toward the second end face 12 in honeycomb structure 100 shown in FIGS. 1 to 3. The size of the test piece 30 is preferably determined as appropriate, so that there is a partition wall 1 (see FIG. 1) on the circumferential surface when the test piece is cut out from the honeycomb structure 100 (see FIG. 1) and the size is closer to the width w, the thickness t and the length L described above. Incidentally, when the size of the honeycomb structure 100 (FIG. 1) not satisfies the width w, the thickness t and length L described above, the size is such that the partition wall 1 (see FIG. 1) is present on the circumferential surface of the test piece 30.

Figure 5:
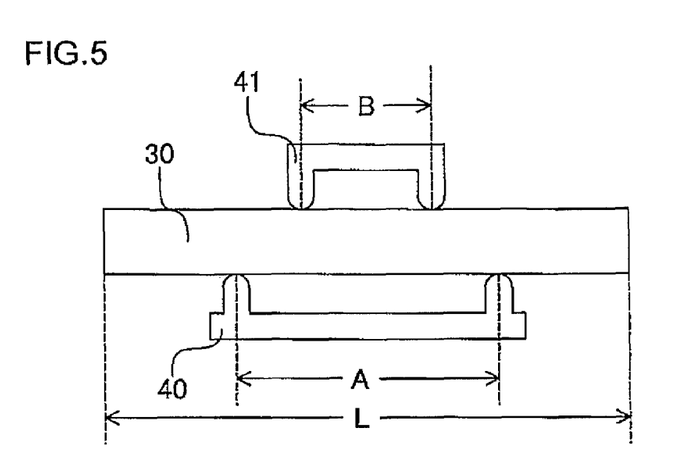
FIG. 5 is a schematic diagram for explaining a measuring method of the material strength F [MPa].

Next, in the measurement of the material strength F [MPa], the test piece 30 as shown in FIG. 4 is dried under a temperature environment of 150° C. for 2 hours. Next, as shown in FIG. 5, the test piece 30 is placed on a supporting fixture 40. Then, a load fixture 41 is vertically pressed against the test piece 30 placed on the supporting fixture 40 to apply a load to the test piece 30. Here, FIG. 5 is a schematic diagram for explaining a measuring method of the material strength F [MPa]. In the test piece 30 shown in FIG. 5, the lateral direction of the paper surface is the length L direction of the test piece 30. The supporting fixture 40 has two support portions for supporting the test piece 30, and the mutual distance between the two support portions (the support span length A) is 60 mm. The load fixture 41 has two pressing portions for applying a load to the test piece 30, and the mutual distance between the two pressing portions (the load span length B) is 20 mm. When applying a load to the test piece 30 by the load fixture 41, the load speed is set to 0.5 mm/min. Then, by increasing the load applied to the test piece 30, the load at the time of breaking of the test piece 30 (P [N]) is read, and the four-point bending strength F0 [Pa] of the test piece 30 is calculated by the following equation (2). However, when the test piece 30 is broken outside the load fixture 41, the measured value is not included in the data for calculating the following equation (2).

[Expression 1]

$$\text{four-point bending strength } F0[Pa] = \frac{3P(A-B)}{2wt^2} \quad \text{Equation(2)}$$

(In the above equation (2), the strength F0 [Pa] indicates the four-point bending strength [Pa] of the A-axis of the test piece 30. P indicates the load P [N] at the time of breaking of the test piece 30. A indicates the support span length A [mm]. B indicates the load span length B [mm]. w indicates the width w [mm] of the test piece 30. t indicates the thickness t [mm] of the test piece 30.).

Apart from the calculation of the equation (2), a finite element method (FEM) model including open end of the cell 2 of the test piece 30 is created from the dimensional information about the thickness of the partition wall 1 included in the test piece 30 and the cell pitch of the cell 2 in the test piece 30. Then, using the strength F0 [MPa] calculated by the above equation (2), the material strength F [MPa] of the material constituting the substantial portion of the partition wall 1 other than the void portion of the cell 2 in the test piece 30 is determined by the finite element method (FEM). Creation of the finite element method (FEM) model can be performed, for example, as follows. As a concrete procedure of the analysis by the finite element method, first, the test piece 30 is modeled by structural analysis software capable of analysis by the finite element method. Examples of the structural analysis software capable of analysis by the finite element method include ANSYS (trade name) manufactured by ANSYS, Inc. and Abaqus (trade name) manufactured by Dassault Systemes, Inc. In creating a model on the structure analysis software, the element division number can be referred to, for example, the description of paragraph 0030 of JP-A-2005-242679, and the element size can be referred to, for example, the description of paragraph 0050 of JP-A-2005-242679. Next, in performing the analysis, a Poisson's ratio and a Young's modulus of the honeycomb structure 100 are set. Thereafter, the bending test method is simulated to perform the analysis by restraining the position of the support pin (e.g., two support portions of the supporting fixture 40) and applying a breaking load obtained by the bending test method to the position the load pin (e.g., two pressing portions of the load fixture 41). Then, from the analysis result, the maximum stress generated with respect to one partition wall is taken as the material strength F.

(Thermal Conductivity k [W/mK])

Also in the measurement of the thermal conductivity k [W/mK], the test piece 30 for measurement as shown in FIG. 4 is cut out from the honeycomb structure 100 (see FIG. 1). However, in the measurement of the thermal conductivity k [W/mK], the size of the test piece 30 is set as follows. The width w of the test piece 30 is about 35 mm, the thickness t of the test piece 30 is about 5 mm, and the length L of the test piece 30 is about 35 mm.

Next, in the measurement of the thermal conductivity k [W/mK], the test piece 30 as shown in FIG. 4 is dried under a temperature environment of 150° C. for 2 hours. Next, the thermal conductivity k0 [W/mK] of the test piece 30 is measured using a steady method thermal conductivity measuring device. The measuring condition of the thermal conductivity k0 [W/mK] is as follows. The measurement temperature is 50° C. The temperature difference at the time of measurement is 24° C. The stability determination time is 3 minutes. The stability judgment temperature range is +0.3° C. As the steady method thermal conductivity measuring device, for example, "GH-1 Series (trade name)" manufactured by ADVANCE RIKO, Inc. can be used.

Apart from the measurement of the thermal conductivity k0 [W/mK] of the test piece 30 described above, the dimensional information about the thickness of the partition wall 1 included in the test piece 30 and the cell pitch of the cell 2 in the test piece 30 is obtained. Then, the thermal conductivity k [W/mK] of the material constituting the substantial portion of the partition wall 1 other than the void portion of the cell 2 in the test piece 30 is determined by the finite element method (FEM) from the dimensional information about the test piece 30 and the measurement results of the thermal conductivity k0 [W/mK] of the test piece 30 described above. For the thermal conductivity k [W/mK], for example, the proportionality factor N in the following equation (3) is determined with the calibration sample, and the thermal resistance Rs [K/W] of the test piece 30 is calculated by the following equation (3). Then, the thermal conductivity k [W/mK] of the material constituting the substantial portion of the partition wall 1 other than the void portion of the cell 2 in the test piece 30 (i.e., the material constituting the partition wall 1) can be determined by the following equation (4).

[Expression 2]

$$Rs = N\left(\frac{Tu - TL}{Q}\right) - R0 \quad \text{Equation(3)}$$

(In the above equation (3), Rs indicates the thermal resistance [K/W] of the test piece 30. N indicates the proportionality factor. TL indicates the lower surface temperature [K] of the test piece 30. Tu indicates the upper surface temperature [K] of the test piece 30. Q indicates the heat flux meter output [W]. Ro indicates the contact thermal resistance [K/W] of the upper and lower interfaces of the test piece 30.).

[Expression 3]

$$Rs = \frac{d}{k} \qquad \text{Equation(4)}$$

(In the above equation (4), d indicates the thickness [m] of the substantial portion of the test piece 30. k indicates the thermal conductivity [W/mK] of the material constituting the substantial portion of the partition wall 1 other than the void portion of the cell 2 in the test piece 30.)

(Bulk Density ρ [g/cc])

The outer diameter and the overall length of the honeycomb structure body 4 constituting the honeycomb structure 100 as shown in FIGS. 1 to 3 are measured to determine the volume of the honeycomb structure body 4. The method of measuring the outer diameter and the overall length of the honeycomb structure body 4 is not particularly limited, and, for example, a contact type gauge may be used, or a non-contact type measuring device such as a laser may be used. In addition, the mass of the honeycomb structure body 4 is measured using a mass sorter. By dividing the measured mass of the honeycomb structure body 4 by the volume of the honeycomb structure body 4, the bulk density ρ [g/cc] of the honeycomb structure body 4 can be obtained.

(Young's Modulus E [GPa])

Also in the measurement of the Young's modulus E [GPa], the test piece 30 for measurement as shown in FIG. 4 is cut out from the honeycomb structure 100 (see FIG. 1). However, in the measurement of the Young's modulus E [GPa], the size of the test piece 30 is set as follows. The width w of the test piece 30 is about 20 mm, the thickness t of the test piece 30 is about 10 mm, and the length L of the test piece 30 is about 120 mm. Incidentally, when the length of the extending direction of the cell 2 from the first end face 11 to the second end face 12 of the honeycomb structure 100 to be measured as shown in FIG. 1 is less than 120 mm, the length L of the test piece 30 shown in FIG. 4 may be appropriately changed in the range of 70 mm or more.

Figure 6:
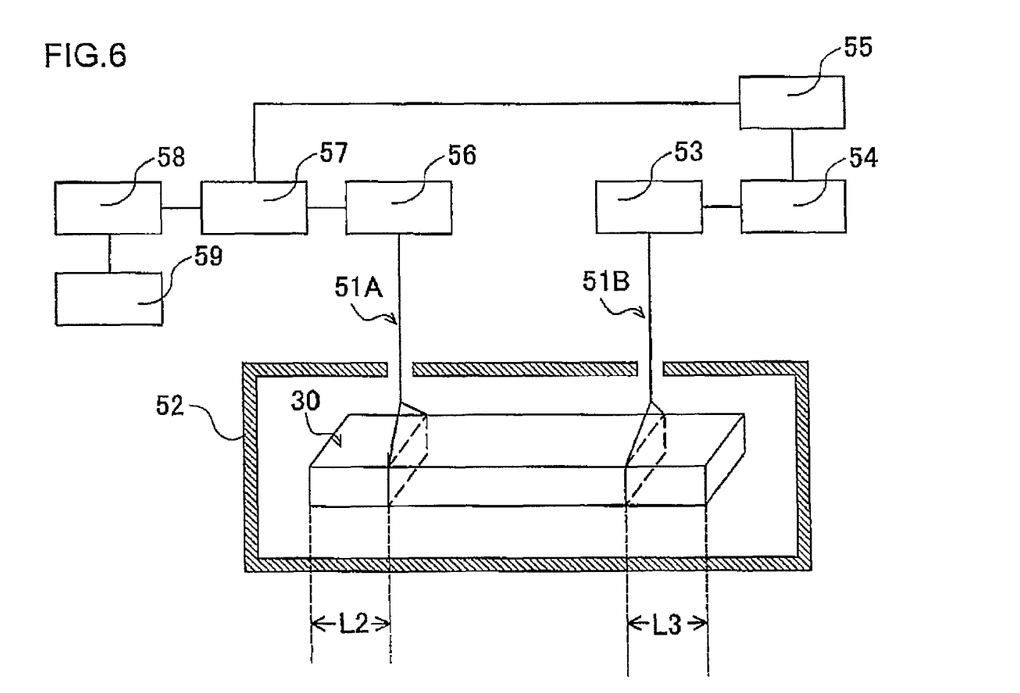
FIG. 6 is a schematic diagram showing a configuration of a test apparatus used for a measurement of the Young's modulus E [GPa].

Next, in measuring the Young's modulus E [GPa], the primary resonance frequency f [s$^{-1}$] of the lateral resonance method of the test piece 30 is measured by using a test device as shown in FIG. 6. FIG. 6 is a schematic diagram showing the configuration of the test device used for measurement of the Young's modulus E [GPa]. The test device shown in FIG. 6 includes an elastic modulus measuring device 52 in which the test piece 30 is disposed therein, two hanging threads 51A and 51B for hanging the test piece 30 in midair, and various measuring instruments shown at reference numerals 53 to 59. The test piece 30 is disposed in the elastic modulus measuring device 52 while being hanged in midair with two hanging threads 51A and 51B. One hanging thread 51A is connected to a driver 56, and the vibration from the driver 56 is transmitted to the test piece 30 along the hanging thread MA. The other hanging thread 51B is connected to a detector 53 and detects the measurement signal for the primary resonance frequency f [s$^{-1}$] of the test piece 30. The electrical signal detected by the detector 53 is amplified by an amplifier 54, the analysis of the electrical signal is performed by an oscilloscope 55. The driver 56 is connected to an amplifier 57 which amplifies the vibration generated by an oscillator 58. The amplifier 57 for amplifying the vibration is separately connected to the oscilloscope 55. Further, the oscillator 58 is connected to a frequency counter 59. Using such a test device, vibrations having different frequencies are applied to the test piece 30, and the primary resonance frequency f [s$^{-1}$] of the lateral resonance method is measured. For hanging position of the test piece 30 by the two hanging threads 51A and 51B, the lengths L2 and L3 from the respective ends of the test piece 30 are each 0.224×L1 mm. Then, the dynamic Young's modulus E0 [GPa] of the test piece 30 is calculated by the following equation (5).

[Expression 4]

$$E0 = 0.9467 \times \left(\frac{L1}{t1}\right)^2 \times \left(\frac{m}{w1}\right) \times f^2 \qquad \text{Equation(5)}$$

(In the above equation (5), E0 indicates the dynamic Young's modulus E0 [GPa] of the test piece 30. L1 indicates the length [m] of the test piece 30. t1 indicates the thickness [m] of the test piece 30. w1 indicates the width [m] of the test piece 30. m indicates the mass [kg] of the test piece 30. f indicates the primary resonance frequency [s$^{-1}$] of the lateral resonance method of the test piece 30.).

Apart from the calculation of the equation (5), a finite element method (FEM) model including open end of the cell 2 of the test piece 30 is created from the dimensional information about the thickness of the partition wall 1 included in the test piece 30, the cell pitch of the cell 2 in the test piece 30, and the like. The finite element method model can use a model similar to that created in the measurement of the material strength F [MPa]. Then, using the dynamic Young's modulus E0 [GPa] calculated by the above equation (5), the Young's modulus E [GPa] of the material constituting the substantial portion of the partition wall 1 other than the void portion of the cell 2 in the test piece 30 is determined by the finite element method (FEM).

(Thermal Expansion Coefficient α [10$^{-6}$/° C.])

Also in the measurement of the thermal expansion coefficient α [10$^{-6}$/° C.], the test piece 30 for measurement as shown in FIG. 4 is cut out from the honeycomb structure 100 as shown in FIG. 1. However, in the measurement of the thermal expansion coefficient α [10$^{-6}$/° C.], the size of the test piece 30 is set as follows. The width w of the test piece 30 is about 3.5 mm, the thickness t of the test piece 30 is about 3.5 mm, and the length L of the test piece 30 is about 50 mm.

Next, in the measurement of the thermal expansion coefficient α [10$^{-6}$/° C.], the obtained test piece 30 is placed in a container together with high-purity silica glass as a reference sample, and the container is set in a thermo dilatometer. As the thermo dilatometer, for example, the "Automatic thermodilatometer 2S-TMA" of Rigaku Corporation can be used. The container set in the thermo dilatometer is heated from 40° C. to 800° C. so that the rate of temperature rise in the container is 10° C./min or less. Then, the difference [mm] in the thermal expansion between the test piece 30 and the reference sample at the time of heating is recorded. Then, the thermal expansion coefficient $CTE_{40-800° C.}$ of the test piece 30 at 40° C. to 800° C. is calculated by the following equation (6). The calculated thermal expansion coefficient $CTE_{40\text{-}800°\ C.}$ of the test piece 30 is the thermal expansion coefficient α [$10^{-6}$/° C.] of the materials constituting the partition wall.

[Expression 5]

$$CET_{40\text{-}800°\ C.} = \frac{\Delta l}{\Delta t \times L} + Cs \quad \text{Equation(6)}$$

(In the above equation (6), $CTE_{40\text{-}800°\ C.}$ indicates the thermal expansion coefficient [$10^{-6}$/° C.] of the test piece 30 at 40° C. to 800° C. Δ1 indicates the difference [mm] of the thermal expansion between the test piece 30 and the reference sample. Δt indicates the temperature difference [° C.] between the start and end of measurement. Therefore, in the measurement described above, Δt is 800° C.-40° C.=760° C. L indicates the length [mm] of the test piece 30. Cs indicates the thermal expansion coefficient [$10^{-6}$/° C.] of the reference sample.)

(Difference in Thickness ΔT [mm] of Circumferential Wall)

Figure 7:
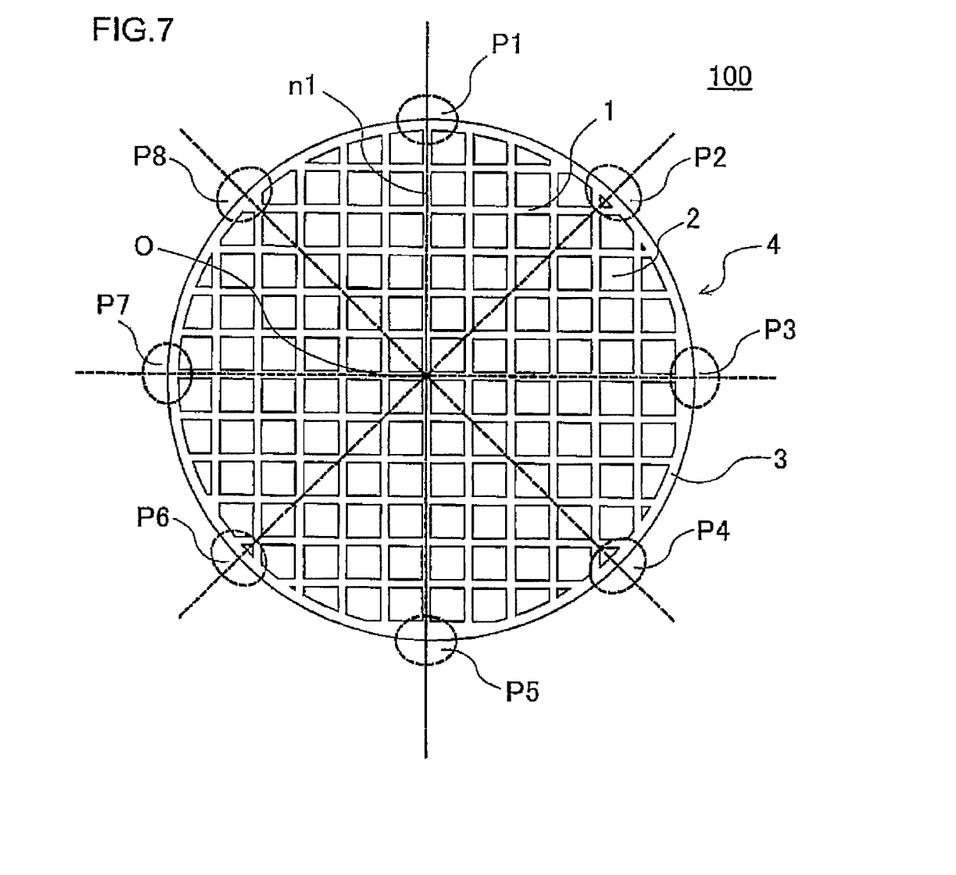
FIG. 7 is a schematic diagram for explaining a measuring method of the difference in thickness ΔT [mm] of the circumferential wall.

As shown in FIG. 7, the thickness [mm] of the circumferential wall 3 is measured at eight points in the end face of the honeycomb structure 100. FIG. 7 is a schematic diagram for explaining a measuring method of the difference ΔT [mm] of thickness of the circumferential wall. In the measurement of the thickness [min] of the circumferential wall 3, first, a first measurement point as the measurement point P1 is determined in the end face of the honeycomb structure 100. The position of the first measurement point P1 is specified as follows. First, the center of gravity O of the end face of the honeycomb structure 100 is found. Then, the virtual straight line n1 parallel to one side of the square cell 2 is extended toward the circumferential wall 3 side from the center of gravity O of the end face of the honeycomb structure 100, the range including the intersection of the virtual straight line n1 and the circumferential wall 3 is the first measurement point P1. Here, the "virtual straight line n1 parallel to one side of the square cell 2" means, for example, in the end face of the honeycomb structure 100, a straight line drawn parallel to the one side direction of the square grid pattern constituted by the partition wall 1. The seven ranges including each point rotated by 45° clockwise with respect to the center of gravity O of the end face of the honeycomb structure 100 from the first measurement point P1 determined as described above, are the measurement points P2, P3, P4, P5, P6, P7, and P8. Then, the thickness [mm] of the circumferential wall 3 is measured at the measurement points P1 to P8 of a total of eight points. Thus, the measurement points P1 to P8 are eight measurement points provided at equal intervals along the surface of the circumferential wall 3 of the honeycomb structure 100. When measuring the thickness [mm] of the circumferential wall 3 at the measurement points P1 to P8, the thickness [mm] is measured at the position where the circumferential wall 3 exists alone in the circumferential part of the end face of the honeycomb structure 100, avoiding the position where the partition wall 1 contacts the circumferential wall 3. Of the eight measurements measured at the measurement points P1 to P8, the largest thickness of the circumferential wall 3 is taken as the maximum thickness T1 [mm] of the circumferential wall 3, and the smallest thickness of the circumferential wall 3 is taken as the minimum thickness T2 [mm] of the circumferential wall 3. Then, the difference in thickness ΔT [mm] of the circumferential wall obtained by subtracting the minimum thickness T2 [mm] of the circumferential wall from the maximum thickness T1 [mm] of the circumferential wall is calculated. The thickness [mm] of the circumferential wall 3 can be measured, for example, using a profile projector or the like. As the profile projector, for example, "Quickvision (trade name)" of Mitutoyo Corporation can be used.

In the honeycomb structure 100 of the present embodiment, the upper limit of P calculated by the above equation (1) is not particularly limited as long as the P is 3.0 or more. However, the P calculated by the above equation (1) is preferably 3.0 to 30, and more preferably 5.5 to 30. With this configuration, it is possible to extremely effectively suppress the occurrence of cracks due to thermal stress.

The individual values of the respective parameters of material strength F, thermal conductivity k, bulk density ρ, Young's modulus E, thermal expansion coefficient α, and the difference in thickness ΔT of the circumferential wall in the above equation (1) are not particularly limited. However, a preferable numerical range of each parameter is as follows.

The material strength F is preferably 4 to 10 [MPa], more preferably 5 to 10 [MPa], and particularly preferably 6 to 10 [MPa]. For example, if the material strength F is less than 4.0 [MPa], it is not preferable in that it may break in canning when mounted on a vehicle due to low strength.

The thermal conductivity k is preferably 0.8 to 2.5 [W/mK], more preferably 1.0 to 2.5 [W/mK], and particularly preferably 1.2 to 2.5 [W/mK]. If the thermal conductivity k is less than 0.8 [W/mK], it is not preferable in that the temperature difference between the circumferential portion and the central portion is increased and the stress generated increases.

The bulk density ρ is preferably 0.16 to 0.50 [g/cc], more preferably 0.16 to 0.36 [g/cc], and particularly preferably 0.16 to 0.22 [g/cc]. If the bulk density ρ exceeds 0.50 [g/cc], it is not preferable in that the time required for the catalytic activation is increased.

The Young's modulus E is preferably 8 to 30 [GPa], more preferably 8 to 20 [GPa], and particularly preferably 8 to 14 [GPa]. On the other hand, if the Young's modulus E exceeds 30 [GPa], it is not preferable in that the stress generated during thermal expansion is increased.

The thermal expansion coefficient α is preferably 0.15 to 0.75 [$10^{-6}$/° C.], more preferably 0.15 to 0.55 [$10^{-6}$/° C.], and particularly preferably 0.15 to 0.35 [$10^{-6}$/° C.]. If the thermal expansion coefficient α exceeds 0.75 [$10^{-6}$/° C.], it is not preferable in that the stress generated during thermal expansion is increased.

The difference in thickness ΔT of the circumferential wall 3 is preferably 0.20 [mm] or less, more preferably 0.15 [mm] or less, and particularly preferably 0.10 [mm] or less. The substantial lower limit of the difference in thickness ΔT of the circumferential wall 3 is 0 [mm]. However, as described above, in the equation (1), when the difference in thickness ΔT of the circumferential wall 3 is less than 0.06 mm, 0.06 is substituted as the value of ΔT. If the difference in thickness ΔT of the circumferential wall 3 exceeds 0.20 [mm], it is not preferable in that the stress generated during thermal expansion is increased.

The thickness of the partition wall 1 is preferably 50 to 160 μm, more preferably 50 to 110 μm, and particularly preferably 50 to 70 μm. If the thickness of the partition wall 1 is less than 50 μm, the isostatic strength of the honeycomb structure 100 may be lowered. If the thickness of the partition wall 1 exceeds 160 μm, pressure loss increases, which may cause a decrease in the engine output or a deterioration in the fuel efficiency. The thickness of the partition wall 1 is measured by observing a section orthogonal to the axial direction of the honeycomb structure 100 by an optical microscope.

The cell density of the honeycomb structure body 4 is preferably, for example, 40 to 190 cells/cm$^2$, more preferably 90 to 190 cells/cm$^2$.

The shape of the cell 2 formed in the honeycomb structure body 4 is not particularly limited. For example, the shape of the cell 2 in the section orthogonal to the extending direction of the cell 2 of honeycomb structure body 4 may be a quadrangular shape. The shape of the cell 2 is preferably a square.

The entire shape of the honeycomb structure 100 is not particularly limited. For example, the entire shape of the honeycomb structure 100 shown in FIGS. 1 to 3 is a round pillar shape in which the first end face 11 and the second end face 12 are circular. In addition, for example, the entire shape of the honeycomb structure 100 may be a pillar shape in which the first end face 11 and the second end face 12 are substantially circular shapes such as an elliptical shape, a racetrack shape or an oval shape.

The material constituting the partition wall 1 is not particularly limited, but cordierite can be cited as the material constituting the partition wall 1 from the viewpoints of strength, thermal resistance, durability, and the like. In the honeycomb structure 100 of the present embodiment, it is preferable that the partition wall 1 is made of a material containing cordierite as a main component.

In the honeycomb structure 100 of the present embodiment, a catalyst for exhaust gas purification may be loaded on at least one of the surface of the partition wall 1 of the honeycomb structure body 4 and the pores of the partition wall 1. With this configuration, CO, NOx, HC and the like in exhaust gas can be turned into harmless substances by catalytic reaction.

When loading a catalyst to the honeycomb structure 100 of the present embodiment, it is preferable that the catalyst contains at least one kind selected from the group consisting of a three-way catalyst, a SCR catalyst, a NOx storage catalyst, and an oxidizing catalyst. The three-way catalyst refers to a catalyst for purifying primarily hydrocarbons (HC), carbon monoxide (CO), and nitrous oxides (NOx). Examples of the three-way catalyst include a catalyst containing platinum (Pt), palladium (Pd), and rhodium (Rh). The SCR catalyst refers to a catalyst that selectively reduces components to be purified. In particular, the SCR catalyst described above is preferably a SCR catalyst for selectively reducing NOx that selectively reduces NOx in exhaust gas. A preferred example of the SCR catalyst for selectively reducing NOx is a catalyst for selectively reducing and purifying NOx in exhaust gas. Further, examples of the SCR catalyst include a metal-substituted zeolite. Examples of the metal that substitutes zeolite include iron (Fe) and copper (Cu). A preferred example of the zeolite is a beta-zeolite. Further, the SCR catalyst may be a catalyst containing at least one selected from the group consisting of vanadium and titania as a main component. Examples of the NOx storage catalyst include alkali metals and alkaline earth metals. Examples of the alkali metal include potassium, sodium, and lithium. Examples of the alkaline earth metal include calcium and the like. Examples of the oxidation catalyst include one containing noble metals. As the oxidation catalyst, specifically, those containing at least one selected from the group consisting of platinum, palladium and rhodium are preferred.

(2) Manufacturing Method of Honeycomb Structure

Next, a manufacturing method of the honeycomb structure of the present invention will be described. Examples of the manufacturing method of the honeycomb structure of the present invention include a method including a process of producing a honeycomb formed body and a process of drying and firing the obtained honeycomb formed body.

(2-1) Forming Process

The forming process is a process of extrusion a kneaded material obtained by kneading a forming raw material into a honeycomb shape to obtain a honeycomb formed body. The honeycomb formed body has a partition wall defining a cell extending from a first end face to a second end face, and a circumferential wall formed so as to encompass outermost circumference of the partition wall. In the forming process, first, the forming raw material is kneaded to obtain a kneaded material. Next, the obtained kneaded material is extruded to obtain a honeycomb formed body in which the partition wall and the circumferential wall are integrally formed.

The forming raw material is preferably obtained by adding a dispersing medium and an additive to a ceramic raw material. Examples of the additive include an organic binder, a pore former, a surfactant, and the like. Examples of the dispersing medium include water and the like. As the forming raw material, the same forming raw material used in the conventionally known manufacturing method of the honeycomb structure can be used. For example, as the pore former, a polyacrylic acid-based polymer, a polymer compound such as starch, foamable resin, or the like, a polymethyl methacrylate (PMMA) resin, or coke can be exemplified.

As a method of kneading the forming raw material to form a kneaded material, for example, a method using a kneader, a vacuum pugmill, or the like can be mentioned.

Extrusion can be performed using a die for extrusion in which a slit corresponding to the sectional shape of the honeycomb formed body is formed. For example, as the die for extrusion, it is preferable to use a die in which a slit corresponding to the shape of the cells in the honeycomb structures described above is formed.

In the forming process, when preparing the kneaded material, the values of the material strength F, the thermal conductivity k, the bulk density p, the Young's modulus E, and the thermal expansion coefficient $\alpha$ in the obtained honeycomb structure can be adjusted in the following manner.

Regarding the adjustment of the values of the material strength F, for example, it is preferable to adjust the averages pore diameter and pore diameter. With this configuration, the value of the material strength F can be increased.

Regarding the adjustment of the values of the thermal conductivity k, for example, it is preferable to adjust the types and amounts of the pore former. With this configuration, the value of the thermal conductivity k can be increased.

Regarding the adjustment of the values of the bulk densities $\rho$, for example, it is preferable to adjust the types and amounts of the pore former. With this configuration, the value of the bulk density $\rho$ can be reduced.

Regarding the adjustment of the values of the Young's modulus E, for example, it is preferable to adjust the average pore diameter. With this configuration, the value of the Young's modulus E can be reduced.

Regarding the adjustment of the values of the thermal expansion coefficient $\alpha$, for example, it is preferable to adjust the amounts of impurities other than cordierite. With this configuration, the value of the thermal expansion coefficient α can be reduced.

(2-2) Firing Process

The firing process is a process of firing the honeycomb formed body obtained by the forming process to obtain a honeycomb structure. Prior to firing the honeycomb formed body, the obtained honeycomb formed body may be dried, for example, by microwave and hot air.

The firing temperature when firing the honeycomb formed body can be appropriately determined depending on the material of the honeycomb formed body.

EXAMPLES

The following will describe in more detail the present invention by examples, but the present invention is not at all limited by these examples.

Example 1

The kneaded material was prepared by adding 2.5 parts by mass of organic pore former, 50 parts by mass of dispersing medium, and 8 parts by mass of binder per 100 parts by mass of cordierite forming raw material, respectively, mixing and kneading. As the cordierite forming raw material, talc, kaolin, alumina, aluminum hydroxide, and silica were used. A polyacrylic acid-based polymer was used as the organic pore former and hydroxypropoxyl cellulose was used as the binder. Fatty acid soap was used as the surfactant and water was used as the dispersing medium.

Next, the kneaded material was extruded using a predetermined mold to obtain a honeycomb formed body in which the cell shape is a quadrangle and the entire shape is a round pillar shape. Next, the honeycomb formed body was dried by a hot-air dryer.

Next, the dried honeycomb formed body was heated and degreased for about 8 hours at about 200° C. under an air atmosphere, and further fired for 4 hours at about 1430° C. under the air atmosphere to prepare a honeycomb structure of Example 1.

In the honeycomb structure of Example 1, the thickness of the partition wall was 64 μm, the cell density was 140 cells/cm$^2$, and the porosity of the partition wall was 46%. The porosity of the partition wall was measured using AutoporeIV (trade name) manufactured by Micromeritics. Table 1 shows the results. The cell shape in the section orthogonal to the extending of the cells of the honeycomb structure cell was a quadrangle.

In the honeycomb structure of Example 1, the shape of the section orthogonal to the axial direction was a circular having a diameter of 86 mm, and the length (total length) in the extending direction of the cell was 123 mm.

TABLE 1

|  | Partition wall Thickness [μm] | Cell density [cm$^2$] | Porosity [%] | Material strength F [MPa] | Thermal conductivity k [W/mK] | Bulk density ρ [g/cc] | Young's modulus E [GPa] | Thermal expansion coefficient α [10$^{-6}$/° C.] | Difference in thickness ΔT of circumferential wall [mm] | Value of P in equation (1) | Safe temperature of thermal shock resistance test [° C.] |
|---|---|---|---|---|---|---|---|---|---|---|---|
| Comparative Example 1 | 64 | 140 | 46 | 7 | 1.5 | 0.23 | 14 | 0.52 | 0.13 | 2.6 | 637 |
| Comparative Example 2 | 64 | 116 | 46 | 7 | 1.5 | 0.21 | 14 | 0.49 | 0.17 | 1.9 | 617 |
| Example 1 | 64 | 140 | 46 | 7 | 1.5 | 0.24 | 14 | 0.44 | 0.09 | 4.5 | 650 |
| Example 2 | 64 | 140 | 47 | 7 | 1.5 | 0.24 | 14 | 0.38 | 0.12 | 3.9 | 650 |
| Example 3 | 64 | 140 | 47 | 7 | 1.5 | 0.21 | 14 | 0.3 | 0.11 | 5.0 | 700 |
| Example 4 | 64 | 140 | 47 | 7 | 1.6 | 0.23 | 14 | 0.43 | 0.14 | 3.2 | 667 |
| Comparative Example 3 | 64 | 140 | 48 | 8 | 1.5 | 0.21 | 16 | 0.45 | 0.15 | 2.3 | 637 |
| Comparative Example 4 | 64 | 140 | 48 | 8 | 1.5 | 0.2 | 16 | 0.45 | 0.16 | 2.0 | 617 |
| Comparative Example 5 | 89 | 93 | 48 | 7 | 1.3 | 0.2 | 15 | 0.38 | 0.15 | 2.2 | 637 |
| Comparative Example 6 | 89 | 93 | 53 | 6 | 1.3 | 0.2 | 11 | 0.4 | 0.14 | 2.5 | 637 |
| Comparative Example 7 | 89 | 93 | 55 | 7 | 1.5 | 0.19 | 10 | 0.4 | 0.16 | 2.8 | 650 |
| Example 5 | 64 | 116 | 55 | 4 | 1.3 | 0.18 | 8 | 0.25 | 0.12 | 3.9 | 650 |
| Example 6 | 64 | 116 | 55 | 6 | 1.3 | 0.18 | 10 | 0.25 | 0.1 | 5.5 | 700 |
| Comparative Example 8 | 89 | 93 | 55 | 6 | 1.5 | 0.19 | 11 | 0.4 | 0.15 | 2.8 | 650 |
| Comparative Example 9 | 89 | 93 | 55 | 6 | 1.4 | 0.19 | 10 | 0.45 | 0.17 | 2.2 | 637 |
| Comparative Example 10 | 64 | 140 | 56 | 5 | 1.3 | 0.2 | 9 | 0.39 | 0.16 | 2.3 | 637 |

Further, in order to obtain P calculated by the above equation (1), the material strength F [MPa], the thermal conductivity k [W/mK], the bulk density ρ [g/cc], the Young's modulus E [GPa], the thermal expansion coefficient α [$10^{-6}$/° C.], and the difference in thickness ΔT of circumferential wall [mm] were obtained for the honeycomb structure of Example 1. Table 1 shows the result. The measuring methods of the material strength F [MPa], the thermal conductivity k [W/mK], the bulk density ρ [g/cc], the Young's modulus E [GPa], the thermal expansion coefficient α [$10^{-6}$/° C.], and the difference in thickness ΔT of circumferential wall [mm] were as described above. Then, P-value of the honeycomb structure of Example 1 was calculated according to the above equation (1). The P-value of the honeycomb structure of Example 1 was 4.5. Table 1 shows the result.

The honeycomb structure of Example 1 was subjected to a thermal shock resistance test in the following manner. Table 1 shows the result.

(Thermal Shock Resistance Test (Safe Temperature))

First, the "safe temperature" of thermal shock resistance of the honeycomb structure manufactured in the examples and comparative examples was measured by the following methods. The "safe temperature" of thermal shock resistance refers to an index that indicates thermal shock resistance. The test procedures for thermal shock resistance test are as follows. First, a honeycomb structure is charged into the electric furnace where the furnace temperature is held at the preset test temperature, and the honeycomb structure is heated for 20 minutes. The test temperature in the electric furnace is set to the temperature obtained by adding a predetermined set temperature to 25° C. as room temperature. After heating the honeycomb structure in the electric furnace for 20 minutes, the honeycomb structure is removed from the electric furnace, and the presence or absence of cracks in the honeycomb structure is checked within 3 minutes after the removal. The presence or absence of cracks shall be determined by visual inspection. If the presence of cracks in the honeycomb structure is not confirmed, the test temperature of the electric furnace is raised by 50° C. Then, the honeycomb structure is charged into the electric furnace in the same manner as described above, heated for 20 minutes, and then removed from the electric furnace, and the presence or absence of cracks of the honeycomb structure is confirmed in the same manner as described above. Then, the test is repeated by stepwise raising the test temperature of the electric furnace until cracks occur. The test temperature of the electric furnace in the last test before cracks occur (in other words, the maximum temperature at which cracks do not occur), was taken as the "safe temperature" of thermal shock resistance. In the thermal shock resistance test, the safe temperatures of 650° C. or higher were considered acceptable.

Examples 2 to 6

In Examples 2 to 6, the honeycomb structures were manufactured as follows.

In Example 2, the honeycomb structure was manufactured by changing the amount of kaolin and the amount of silica with respect to Example 1.

In Example 3, the honeycomb structure was manufactured by changing the amount of alumina and the amount of aluminum hydroxide with respect to Example 1.

In Example 4, the honeycomb structure was manufactured by changing the amount of pore former with respect to Example 1.

In Example 5, the honeycomb structure was manufactured by changing the amount of kaolin, the type of silica, and the type and amount of pore former with respect to Example 1.

In Example 6, the honeycomb structure was manufactured by changing the amount of kaolin, the type and amount of silica, the amount of alumina, the amount of aluminum hydroxide, and the type and amount of pore former with respect to Example 1.

The thickness of the partition wall, the cell density, and the porosity of the honeycomb structures in Examples 2 to 6 are shown in Table 1. In addition, the material strength F [MPa], the thermal conductivity k [W/mK], the bulk density ρ [g/cc], the Young's modulus E [GPa], the thermal expansion coefficient α [$10^{-6}$/° C.], and the difference in thickness of circumferential wall ΔT [mm] were measured to determine P calculated by the above equation (1). Table 1 shows the results.

Comparative Examples 1 to 27

In Comparative Examples 1 to 27, the honeycomb structures were manufactured as follows.

In Comparative Example 1, the honeycomb structure was manufactured by changing the amount of kaolin, the type of aluminum hydroxide, and the amount of pore former with respect to Example 1.

In Comparative Example 2, the honeycomb structure was manufactured by changing the amount of kaolin, the amount of silica, the amount of alumina, the amount of aluminum hydroxide, and the amount of pore former with respect to Example 1.

In Comparative Examples 3 and 4, the honeycomb structure was manufactured by changing the amount of silica with respect to Example 1.

In Comparative Example 5, the honeycomb structure was manufactured by changing the type of pore former with respect to Example 1.

In Comparative Example 6, the honeycomb structure was manufactured by changing the amount of kaolin and the type of silica with respect to Example 1.

In Comparative Example 7, the honeycomb structure was manufactured by changing the type and amount of silica with respect to Example 1.

In Comparative Example 8, the honeycomb structure was manufactured by changing the type and amount of silica with respect to Example 1.

In Comparative Example 9, the honeycomb structure was manufactured by changing the type and amount of silica with respect to Example 1.

In Comparative Example 10, the honeycomb structure was manufactured by changing the type of silica, the type and the amount of pore former with respect to Example 1.

In Comparative Examples 12 to 15, the honeycomb structure was manufactured by changing the type of talc, the amount of kaolin, the amount of silica, and the amount of pore former with respect to Example 1.

In Comparative Examples 16 to 25, the honeycomb structure was manufactured by changing the type of talc, the amount of kaolin, and the amount of pore former with respect to Example 1.

In Comparative Examples 26 and 27, the honeycomb structure was manufactured by changing the amount of silica and the amount of pore former with respect to Example 1.

The thickness of the partition wall, the cell density, and the porosity of the honeycomb structures in Comparative Examples 1 to 27 are shown in Tables 1 and 2. In addition, the material strength F [MPa], the thermal conductivity k

[W/mK], the bulk density ρ [g/cc], the Young's modulus E [GPa], the thermal expansion coefficient α [$10^{-6}$/° C.], and the difference in thickness of circumferential wall ΔT [mm] were measured to determine P calculated by the above equation (1). The results are shown in Tables 1 and 2.

INDUSTRIAL APPLICABILITY

The honeycomb structure of the present invention can be utilized as a catalyst carrier for loading catalysts for exhaust gas purification.

TABLE 2

| | Partition wall Thickness [μm] | Cell density [cm²] | Porosity [%] | Material strength F [MPa] | Thermal conductivity k [W/mK] | Bulk density ρ [g/cc] | Young's modulus E [GPa] | Thermal expansion coefficient α [$10^{-6}$/° C.] | Difference in thickness ΔT of circumferential wall [mm] | Value of P in equation (1) | Safe temperature of thermal shock resistance test [° C.] |
|---|---|---|---|---|---|---|---|---|---|---|---|
| Comparative Example 11 | 64 | 93 | 26 | 10 | 2.5 | 0.24 | 25 | 0.31 | 0.1 | 7.9 | 750 |
| Comparative Example 12 | 64 | 116 | 27 | 10 | 2.3 | 0.28 | 26 | 0.27 | 0.09 | 10.8 | 750 |
| Comparative Example 13 | 64 | 116 | 27 | 10 | 2.3 | 0.29 | 25 | 0.31 | 0.12 | 7.2 | 733 |
| Comparative Example 14 | 64 | 140 | 27 | 10 | 2.3 | 0.32 | 25 | 0.24 | 0.17 | 7.2 | 750 |
| Comparative Example 15 | 64 | 140 | 28 | 10 | 2.2 | 0.31 | 25 | 0.24 | 0.08 | 15.5 | 800 |
| Comparative Example 16 | 109 | 47 | 30 | 10 | 2.2 | 0.24 | 24 | 0.24 | 0.06 | 14.7 | 783 |
| Comparative Example 17 | 109 | 47 | 31 | 10 | 2.1 | 0.27 | 23 | 0.27 | 0.09 | 10.3 | 750 |
| Comparative Example 18 | 109 | 47 | 32 | 10 | 2.1 | 0.28 | 23 | 0.24 | 0.13 | 7.8 | 750 |
| Comparative Example 19 | 109 | 47 | 32 | 9 | 2.1 | 0.27 | 23 | 0.18 | 0.1 | 13.2 | 750 |
| Comparative Example 20 | 64 | 140 | 32 | 9 | 1.9 | 0.25 | 20 | 0.33 | 0.06 | 10.2 | 783 |
| Comparative Example 21 | 64 | 140 | 32 | 9 | 2.1 | 0.25 | 22 | 0.34 | 0.06 | 10.7 | 783 |
| Comparative Example 22 | 64 | 140 | 32 | 9 | 2.1 | 0.25 | 22 | 0.34 | 0.06 | 10.7 | 783 |
| Comparative Example 23 | 109 | 62 | 32 | 9 | 2.1 | 0.28 | 22 | 0.3 | 0.1 | 8.2 | 760 |
| Comparative Example 24 | 152 | 93 | 33 | 9 | 2.1 | 0.46 | 22 | 0.33 | 0.06 | 20.1 | 850 |
| Comparative Example 25 | 109 | 47 | 33 | 9 | 2.1 | 0.27 | 22 | 0.19 | 0.11 | 11.5 | 750 |
| Comparative Example 26 | 64 | 140 | 43 | 7 | 1.6 | 0.25 | 16 | 0.48 | 0.1 | 4.2 | 667 |
| Comparative Example 27 | 64 | 140 | 44 | 6 | 1.5 | 0.23 | 15 | 0.46 | 0.06 | 5.2 | 683 |

The honeycomb structures of Examples 2 to 6 and Comparative Examples 1 to 27 were also subjected to the thermal shock resistance test in the same manner as in Example 1. The results are shown in Tables 1 and 2.
(Results)

The honeycomb structures of Examples 1 to 6 met the acceptance criterion of 650° C. or higher for the safe temperature in the thermal shock resistance test. On the other hand, the honeycomb structures of Comparative Examples 1 to 10 had P-values of less than 3.0, while the honeycomb structures of Comparative Examples 7 and 8 had safe temperatures of 650° C. The temperature increment of the test methods was 50° C., and it is estimated that it exceeded 650° C. due to the variations of each factor. Although there were variations, P-values of 3.0 or higher gave results of 650° C. or higher, indicating the validity of the calculation equation. Conventional techniques that calculate only from the material strength, the Young's modulus, and the thermal expansion coefficient (e.g., conventional thermal shock resistance factors) cannot estimate the results of this test.

DESCRIPTION OF REFERENCE NUMERALS

1: partition wall, 2: cell, 3: circumferential wall, 4: honeycomb structure body, 11: first end face, 12: second end face, 30: test piece, 40: supporting fixture, 41: load fixture, 51A, 51B: hanging thread, 52: elastic modulus measuring device, 53: detector, 54: amplifier, 55: oscilloscope, 56: driver, 57: amplifier, 58: oscillator, 59: frequency counter, A: support span length, B: load span length, L: length of test piece, n1: virtual straight line, O: center of gravity, P1, P2, P3, P4, P5, P6, P7, P8: measurement point, t: thickness of test piece, w: width of test piece, 100: honeycomb structure

What is claimed is:
1. A honeycomb structure comprising: a pillar-shaped honeycomb structure body having porous partition walls disposed so as to surround a plurality of cells serving as fluid through channels extending from a first end face to a second end face, and having a circumferential wall disposed so as to encompass the partition walls, wherein
each cell of the plurality of cells is a fluid through channel formed by a through hole that is entirely open from the first end face to the second end face,
the partition walls and the circumferential wall constituting the honeycomb structure body are an integrally formed product made of the same material containing cordierite as a main component, a porosity of the partition walls is 45 to 70%, when a material strength of the material constituting the partition walls is set to F (MPa), and the material strength F is 4 to 10 (MPa), a thermal conductivity of the material constituting the partition walls is set to k (W/mk), a bulk density of the honeycomb structure body is set to $\rho$ (g/cc), a Young's modulus of the material constituting the partition walls is set to E (GPa), and the Young's modulus E is 10 to 30 (GPa), a thermal expansion coefficient of the material constituting the partition walls is set to a ($10^{-6}/°$ C.), and in a section orthogonal to the extending direction of the cells of the honeycomb structure body, a difference in thickness of the circumferential wall obtained by subtracting the minimum thickness T2 (mm) of the circumferential wall from the maximum thickness T1 (mm) of the circumferential wall is set to $\Delta T$ (mm), P calculated by the following equation (1) is 3.0 to 30, $$P = F \times k \times \rho / (E \times \alpha \times \Delta T) \qquad \text{Equation (1):}$$

wherein, in the equation (1), when the difference in thickness of the circumferential wall represented by $\Delta T$ is less than 0.06 mm, 0.06 shall be substituted as the value of $\Delta T$, and wherein a catalyst for exhaust gas purification is loaded on at least one of a surface of the partition walls and pores of the partition walls.

2. The honeycomb structure according to claim 1, wherein the thermal conductivity k is 0.8 to 2.5 (W/mK).

3. The honeycomb structure according to claim 1, wherein the bulk density $\rho$ is 0.16 to 0.50 (g/cc).

4. The honeycomb structure according to claim 1, wherein the thermal expansion coefficient $\alpha$ is 0.10 to 0.75–($10^{-6}/°$ C.).

5. The honeycomb structure according to claim 1, wherein the difference in thickness $\Delta T$ of the circumferential wall is 0.20 (mm) or less.

6. The honeycomb structure according to claim 1, wherein the P calculated by the equation (1) is 5.5 to 30.

* * * * *